July 29, 1958 H. H. WENDELA 2,844,999
REAR VIEW MIRROR
Filed Oct. 25, 1954

INVENTOR
Hugo H. Wendela
BY
L. J. Burch
ATTORNEY

United States Patent Office 2,844,999
Patented July 29, 1958

2,844,999
REAR VIEW MIRROR

Hugo H. Wendela, Detroit, Mich., assignor to General Motors Corporation, Detroit, Mich., a corporation of Delaware Application October 25, 1954, Serial No. 464,238

2 Claims. (Cl. 88—93)

This invention relates to rear view mirrors in general and more particularly to external rear view mirrors for use with automotive and other vehicles.

External rear view mirrors which are used with automotive vehicles are generally secured to the vehicle door or body near a window and usually include means by which one may properly adjust the mirror by reaching through the open window and outside the vehicle. In cold or inclement weather lowering the vehicle window and reaching outside is a great inconvenience especially since the hand covers the mirror during adjustment and requires several adjustments to be made. While remote control means located inside the vehicle have been proposed for spotlights and the like such means have not been adaptable to rear view mirrors alone because of the cost incident to manufacture and installation. A rear view mirror requires adjustment so seldom in comparison to a spotlight for example, that such cost for the added convenience has not seemed worthwhile to the used thereof.

It is now proposed to provide an external rear view mirror which includes means of adjustment that may be located within the vehicle. The adjustment means proposed for use is inexpensive and adds little to the cost of the mirror in that few additional parts are necessary and all are individually inexpensive. The proposed mirror may be readily assembled prior to installation within a vehicle and is thus assured of suitable operation after installation without further adjustment.

The proposed assembly includes a mirror mounted on a supporting arm attached to a base member which is adapted to be secured to a vehicle door or body. A control rod extends from within the vehicle through the door or body and is secured to the mirror support arm. Rotation of the control rod rotates the support arm and changes the alignment of the mirror. The support arm is frictionally held to the base member at the mirror end eliminating any adjustment for play or slack at the control end.

Figure 1:
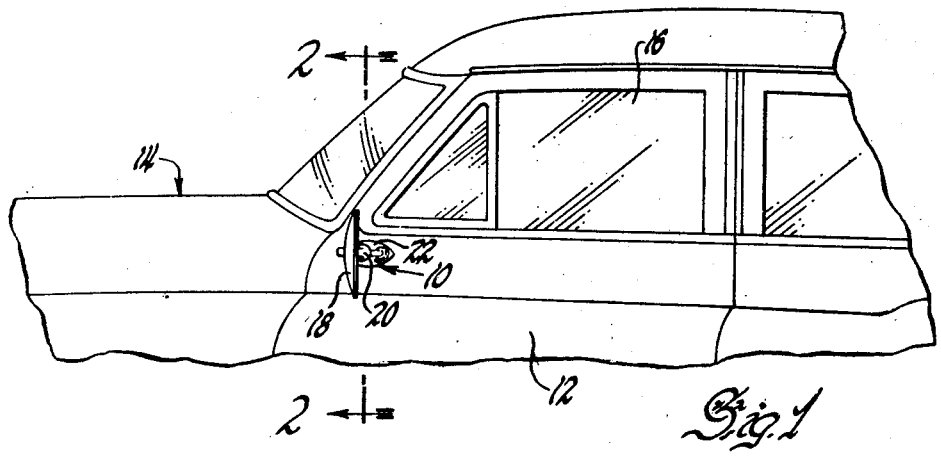
Figure 1 is a fragmentary view of a vehicle body having the proposed mirror mounted thereon.
Figure 2:
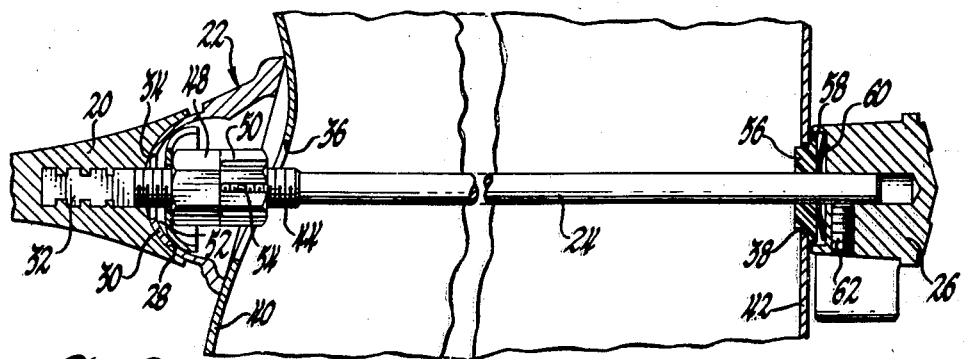
Figure 2 is a cross-sectional view of the proposed mirror assembly taken substantially in the plane of line 2—2 of Figure 1.
Figure 3:
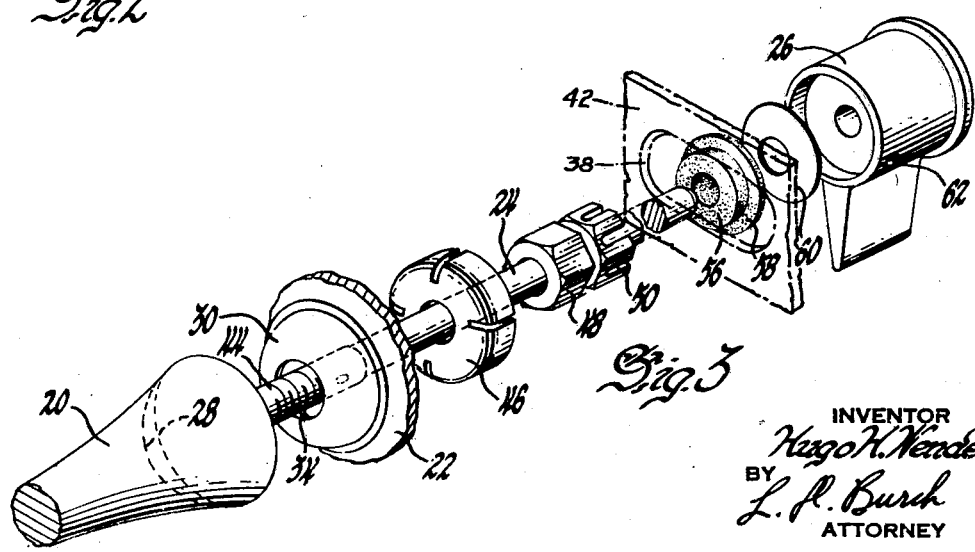
Figure 3 is an exploded view of the proposed mirror assembly showing the various parts included therein.

As with most external rear view mirrors the proposed mirror assembly 10 is secured to the door 12 of a vehicle body 14 and near a side window 16 thereof where it may be viewed by one seated within the vehicle. The assembly 10 includes a mirror 18, a support arm or shank 20, a base plate 22, a control rod 24 and a control knob 26. The mirror 18 is preferably secured to the support arm 20 in fixed position though it may be adjustable as is conventional. The end of the support arm 20 is cupped or concave as at 28 and is adapted to be received upon a hemispherical or ball-shaped shell 30 formed from the base plate 22. This forms a ball and socket joint by which the support arm 20 and mirror 18 may be adjusted as will be explained.

The control rod 24 is secured to the support arm 20 as at 32 and extends through an opening 34 formed centrally through the hemispherical shell 30 of the base plate 22 and through openings 36 and 38 formed respectively through door panels 40 and 42. The end of the control rod 24 near the support arm 20 is threaded as at 44 and receives a spring cup washer 46, threaded nut 48 and lock nut 50 within the concave portion 52 of the hemispherical shell 30. By urging the spring cup washer 46 against shell 30 the socket end 28 of the support arm 20 is frictionally held thereagainst. A taper pin 54 may be used to fix the nuts 48 and 50 permanently in place.

Once the support arm 20 has been frictionally engaged with the base plate 22 and the control rod 24 extended through the vehicle door panels 40 and 42 the base plate 22 may be secured to the exterior door panel 40 in any acceptable manner. A bushing member 56 is disposed about the end of the control rod 24 within the vehicle body to fit within opening 38 of door panel 42 and is flanged as at 58. A spring washer 60 is also disposed about the end of control rod 24 and the control knob 26 is received thereover. The control knob is fixed in place by a set screw 62 threaded therethrough and bearing against the control rod 24.

The adjustable rear view mirror 10 is easily assembled prior to installation except for the control knob 26 and incident members by which play or slack may be taken up to provide a rattle-free installation.

Rotation of the control rod 24 by knob 26 rotates the support arm 20 and enables the adjustment of the mirror in a vertical plane. Although such adjustment is generally sufficient, especially where the mirror 18 as fixed to the support arm 20 has been designed for proper aligned rearward vision, slight adjustment in the horizontal plane may be provided by the large clearance between control rod 24 and the edge of opening 34 formed within the ball joint 30 of base plate 22. The elongated slot 38 in panel 42 permits this adjustment. The combination of such adjustments thus provides universal adjustment means for the mirror.

I claim:

1. In a remote control rear view mirror assembly for attachment to spaced wall panels and including a mirror supporting member and a base member for receiving said supporting member, said base and supporting members each being formed to provide cooperating parts of a ball and socket joint and each being disposed externally of the outermost of said spaced wall panels, and a remote control rod connected to said supporting member and extended through said base member and adapted to be extended through each of said spaced wall panels; means providing for the pre-assembly of said supporting member, base member and remote control rod and the pre-tensioning of said ball and socket joint parts in secure frictional and relatively movable relation which comprises, a recess formed within the surface of said base member next adjacent the outermost of said wall panels against which it is to be disposed, and spring means operatively engaged and disposed wholly within said recess between the innermost end of said recess and said control rod, said control rod including adjustable spring stop means threaded thereon and engaging said spring means for adjustable tensioning thereof, and said spring means providing the sole means of tensioning and holding said ball and socket joint parts in engagement.

2. The pre-assembly and pre-tensioning means of claim 1 in combination with the mirror assembly provided therein, wherein said spring means includes an annular cupped spring washer slidably disposed upon said control rod, the innermost end of said recess being formed to provide a cooperating cup shaped surface.

References Cited in the file of this patent

UNITED STATES PATENTS

| | | |
|---|---|---|
| 1,446,164 | D'Eyraud | Feb. 20, 1923 |
| 1,684,695 | Draper | Sept. 18, 1928 |
| 1,796,093 | Florman | Mar. 10, 1931 |
| 1,906,489 | Sklarek | May 2, 1933 |
| 1,909,526 | Falge et al. | May 16, 1933 |
| 2,456,362 | Aves | Dec. 14, 1948 |
| 2,644,363 | Capitani | July 7, 1953 |
| 2,746,355 | Wells | May 22, 1956 |